(No Model.)
T. A. EDISON.
VACUUM PUMP.
No. 251,536. Patented Dec. 27, 1881.
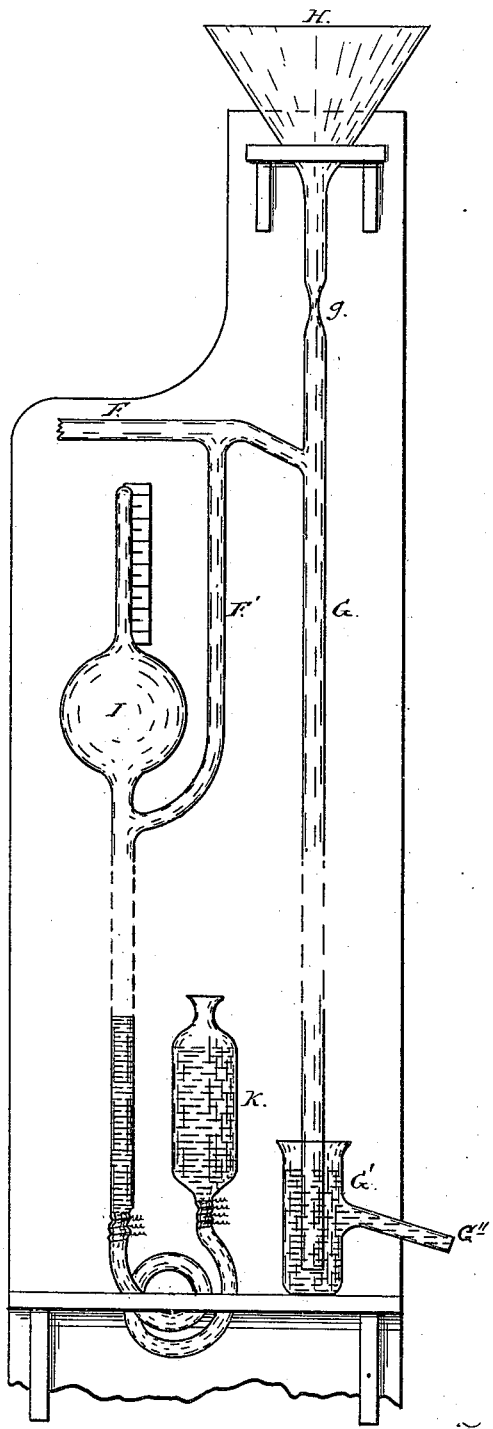
Attest:
F. W. Howard
J. Ells Clark.
Inventor:
T. A. Edison
Per Dyer and Wilber
Att'ys

United States Patent Office.

THOMAS A. EDISON, OF MENLO PARK, NEW JERSEY.

VACUUM-PUMP.

SPECIFICATION forming part of Letters Patent No. 251,536, dated December 27, 1881.

Application filed December 7, 1881. (No model.)

*To all whom it may concern:*

Be it known that I, THOMAS A. EDISON, of Menlo Park, in the county of Middlesex and State of New Jersey, have invented a new and useful Improvement in Vacuum-Pumps; and I do hereby declare that the following is a full and exact description of the same, reference being had to the accompanying drawing, and to the letters of reference marked thereon.

This invention has reference to improvements in the Sprengel air-pumps for producing high vacua; and it consists, essentially, in a contraction in the supply-tube formed integral therewith above the fall-tube.

In the Sprengel air-pumps heretofore in general use the mercury-supply tube and mercury-fall tube were connected by a rubber joint with a pinch-cock for regulating the size of the contraction in the rubber joint. More recently, in some instances, the pinch-cock has been dispensed with and a glass stop-cock used in lieu thereof. The pinch-cock and the glass stop-cocks have been found to be liable to leakage, the latter requiring an absolutely-true grinding of its parts—an expensive and difficult operation.

My invention is designed to avoid these objections, so that a pump capable of producing high vacua may be readily, certainly, and cheaply produced. Such a pump is illustrated in the drawing hereto annexed, which shows, in elevation, a pump embodying my invention.

As here shown, the pump proper is the long tube G, having at its upper end a mercury-reservoir, H, which may be integral therewith, as shown, or the upper part of G may be attached to a pipe leading from a reservoir supplying many pumps, as shown in Patent No. 248,425, dated October 18, 1881. At a little distance from its upper end the tube G is contracted into a narrow orifice, $g$, of a size permitting the mercury to pass therethrough drop by drop only. This contraction $g$ takes the place of the rubber joint and of the glass stop-cock before referred to, and is formed integral with the supply-tube, the part of the tube above the end of the contraction being known as the "supply-tube" and the part below such point the "fall tube." At a little distance below $g$ the tube F enters G, preferably by a downward bend, F being the tube to which is attached the article or vessel to be exhausted of air.

G', as here shown, is a vessel for catching the mercury passing through the pump, and keeping the bottom of the tube or pump G sealed air-tight, the vent or overflow tube G'' being above the bottom or end of G.

Connected to F by a tube, F', is a McLeod gage, I, for determining the degree of exhaustion.

What I claim is—

In a Sprengel air-pump, the mercury-supply tube having formed integral therewith a contraction above the fall-tube for regulating the flow of mercury, substantially as and for the purpose specified.

This specification signed and witnessed this 5th day of December, 1881.

T. A. EDISON.

Witnesses:
H. W. SEELY,
WM. H. MEADOWCROFT.